Feb. 1, 1938. H. TOFTE 2,106,861
DRINK MIXER
Filed Dec. 26, 1935 2 Sheets-Sheet 2
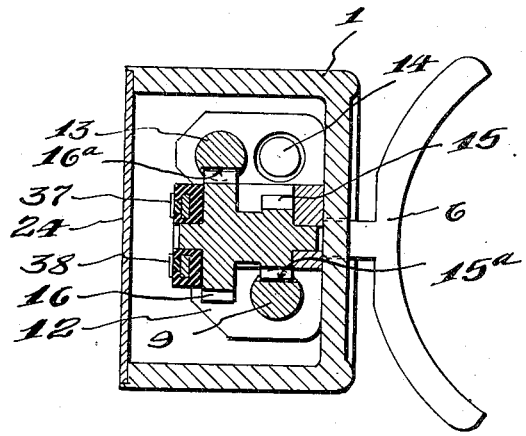
_Fig-3-_
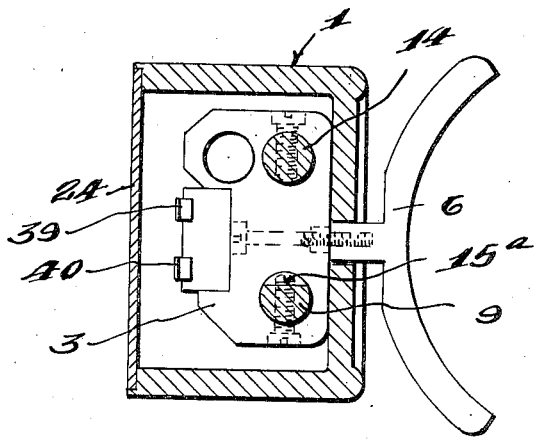
_Fig-4-_
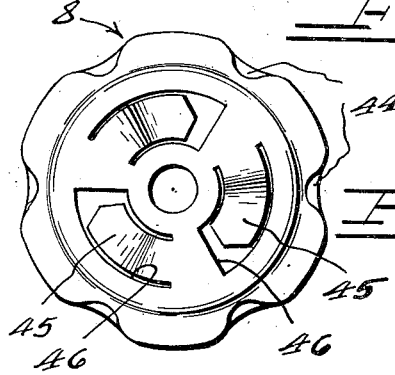
_Fig-6-_
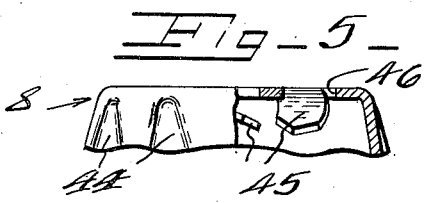
_Fig-5-_
INVENTOR.
Harold Tofte
BY Bradell & Thompson
ATTORNEYS.

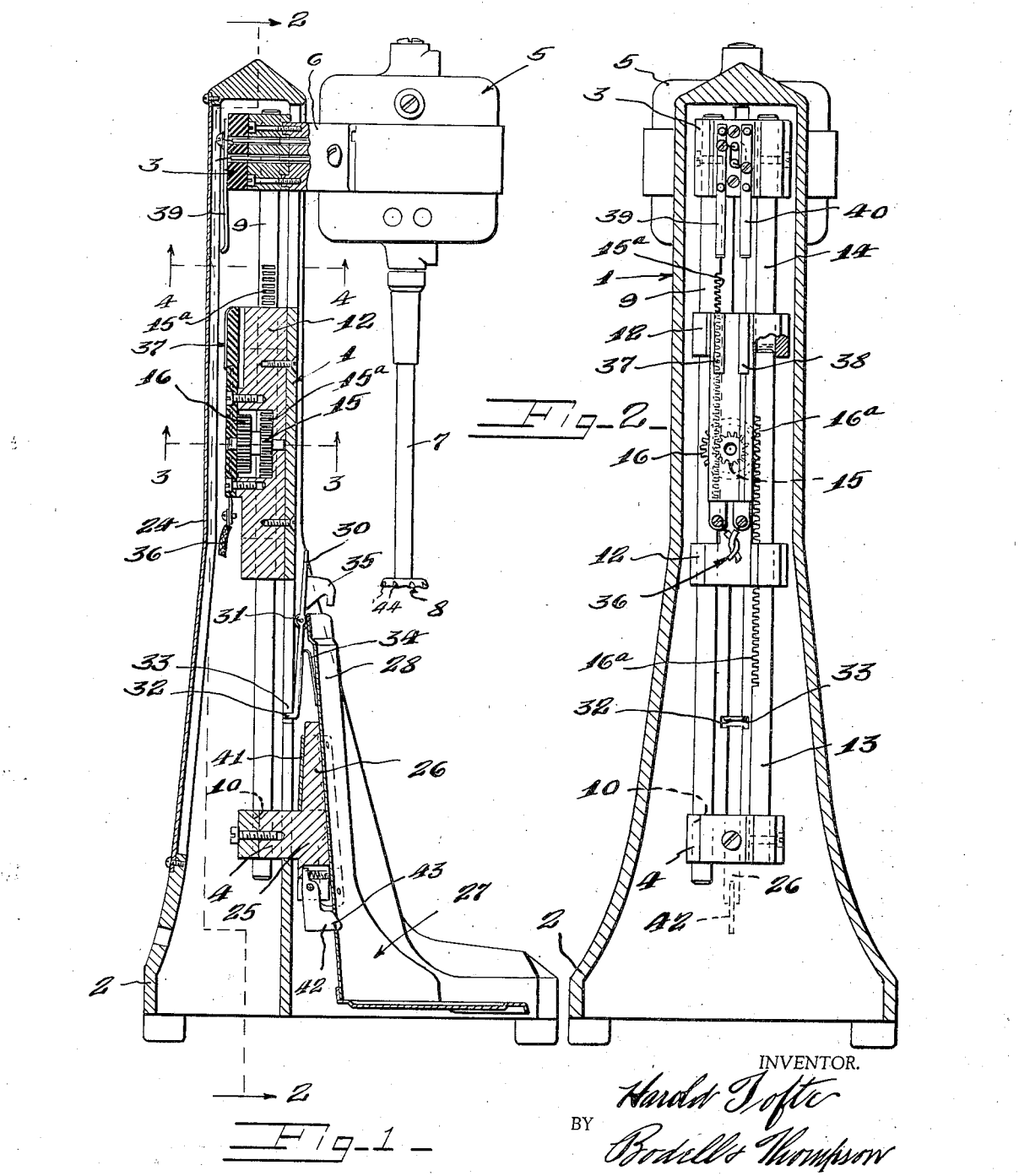

Patented Feb. 1, 1938

2,106,861

UNITED STATES PATENT OFFICE 2,106,861

DRINK MIXER

Harold Tofte, Syracuse, N. Y., assignor to T. N. Benedict Manufacturing Company, East Syracuse, N. Y., a corporation of New York Application December 26, 1935, Serial No. 56,199

10 Claims. (Cl. 259—108)

This invention relates to mixers for mixing beverages, semi-solid foods, etc., and to what for the sake of convenience and brevity is generally called a drink mixer, although the same type of mixer is used for mixing other than drinks or beverages. It relates more particularly to drink mixers in which the stirrer and the cup support both have movement toward and from each other to carry the cup and stirrer into and out of juxtaposition to each other.

It has for its object a particularly simple, economical and compact motion transmitting and reversing mechanism between the motor carriage and the cup carriage.

It further has for its object a motion transmitting and reversing mechanism through which the weight of the motor and the cup when filled is nearly balanced, it being understood that the motor and parts carried thereby are heavy, compared with the cup with its contents and the cup support and carriage.

It further has for its object a motion transmitting and reversing mechanism, whereby the cup and rotor will remain stationary at any intermediate elevation it is placed, for the purpose of locating the stirrer button at any height in the cup.

It further has for its object the motion transmitting and reversing mechanism between the reversely movable motor and cup supports or blocks including opposing racks on the supports respectively, and coaxially mounted pinions meshing with the racks respectively, the pinions being of different diameters and rotatable as a unit.

It further has for its object a simple and compact mounting for the supports or blocks and the guide means therefor, and further this guide means including rods on which the racks are formed.

It further has for its object a particularly simple and compact assembly of the supports or blocks, the guide means and the motion transmitting means within a standard. It also has for its object a particularly simple latch means which holds the cup support or block in its lowermost position from movement upwardly, which latch means is tripped by the upper edge of the cup when the cup is lifted upwardly slightly off the support.

It also has for its object a novel stirrer construction.

The invention consists in the novel features and in the combinations and constructions hereinafter set forth and claimed.

In describing this invention, reference is had to the accompanying drawings in which like characters designate corresponding parts in all the views.

Figure 1 is a vertical sectional view of a drink mixer embodying my invention.

Figure 2 is a sectional view on the line of 2—2, Figure 1.

Figures 3 and 4 are enlarged sectional views on lines 3—3 and 4—4, Figure 1.

Figures 5 and 6 are respectively an edge view, partly broken away, and a plan view of the stirrer.

I designates a suitable standard or upright having a base 2. 3 and 4 designate, respectively, the upper and lower supports or blocks, which are movable vertically of the standard. 5 designates a motor carried by the upper support 3, it being connected thereto by a suitable bracket 6. 7 is a stirring rod depending vertically from the rotor or shaft of the motor, this having the usual stirrer or button 8 at its lower end.

9 designates a rod depending from the upper support or block 3 parallel to the path of movement of the support, this rod also extending through and being slidable in passages 10 in the lower support or block. It is also slidable through a supporting block 12 fixed to the standard between the supports 3, 4, this block 12 having a suitable guide passage for the rod 9. 13 is a similar rod fixed at its lower end to the support 4 and extending through a guide passage in the block 12. The upper support 3 is also provided with an additional depending guide rod 14 extending into a guide passage in the block 12. This short guide rod 14 is used because the guide rod 13 of the lower support 4 does not extend into the passage in the upper support 3, when the supports 3, 4 are separated to their fullest extent. However, the upper end of the rod 13 does enter a passage in the upper support 3, as the upper support approaches its uppermost position. The short rod is used to avoid excessive height of the standard to accommodate a rod, as 13, if this rod extended through the support 3 in the same manner as the rod 9 extends through the support 4.

The motion transmitting and reversing means between the supports 3, 4 includes the guide rods 9 and 13 and a gear device carried by the block 12 and coacting with the rods 9 and 13. Preferably, the gear device is a double pinion 15, 16 having peripheral surfaces of different diameters or a pair of coaxially mounted pinions of different diameters rotatable as a unit and meshing respectively with racks 15ᵃ and 16ᵃ provided, respectively, on the rods 9 and 13.

The motor and parts carried thereby are heavier than the cup support with the filled cup thereon and owing to the double pinion 15, 16, the motor and parts carried thereby substantially balance the cup support with the filled cup thereon and eliminate violent action, shocks or throwing of the cup, when the cup support is released from the latch to be presently described. Also, the filled cup and the stirrer will remain stationary at different heights, this being desirable in mixing some drinks where it is desirable to locate the stirrer different depths in the cup. However, the gear ratio between the pinion and racks may be such as to cause the weight of the motor and associated parts to slightly overbalance the cup support or block with the filled cup thereon, so that the lower support and filled cup automatically lifts to bring the cup in juxtaposition to the stirrer, when the lower support is released of its latch or holding means.

In the illustrated embodiment of my invention, the standard 1 is shown as channel-shaped in cross section with the supports or blocks 3, 4 and supporting block 12 located in the channel. The channel is open at the rear side of the standard and the bottom thereof is provided with slots opening through the front side of the standard, through which the motor bracket 6 and the bracket for the cup support extend. The rear open side of the standard is closed by a suitable removable face plate 24. The cup support has an arm or bracket 25 which extends through the slot in the bottom of the channel and is provided with a head 26 on which is mounted a shelf or cup holder 27, this having an upright portion covering the head 26. When the cup is empty and resting on the holder 27 or when no cup is on the holder 27, the overbalancing weight of the motor 5 would cause the motor to move downwardly and the cup support to move upwardly. In order to hold the motor in its upward position and the cup holder in its lowermost position, latch means is provided, which latch means is tripped when the upper edge of the cup is brought into engagement with the latch.

30 designates a latch member carried by the upwardly extending portion 28 of the cup holder 27, it being pivoted between its ends thereto at 31 and having a nose or pawl 32 at its lower end, which engages a suitable shoulder 33 in the outer face of the bottom of the channel of the standard, this shoulder 33 being provided by forming a slot in the bottom of the channel. The latch member is pressed into its engaged position by a spring 34. The latch member has an arm extending above the upper edge of the upright portion 28 of the cup holder and is provided with a trip arm 35 overhanging the upper edge of the upright portion 28 of the cup holder. By pressing the upper edge of the cup against the trip arm 35, the latch member 30 is moved on its pivot, thus disengaging the nose 32 from the shoulder 33 so that the cup holder can be moved upwardly, and hence the motor and the stirrer moved downwardly, carrying the stirrer into the cup and the cup up around the stirrer. No appreciable upward force is required to effect this movement, because of the compensating or balancing effect of the pinions 15, 16. Owing to this compensating mechanism, the movement of the motor and cup supports or blocks is effected with no appreciable effort, and furthermore the supports or blocks will remain inert in any intermediate position, thus permitting the stirrer to be located at different heights in the contents of the cup.

The electric current is supplied to the motor through suitable feed wires 36 connected to contacts 37, 38 on the supporting block 12 and through spring contacts 39, 40 carried by the upper support or block 3 and coming into wiping engagement with the former contacts, as the motor support moves downward. The contacts 39, 40 on the support 3 are connected in any suitable manner to the motor terminals. The head 26 of the lower support 4 slidably fits into a socket 41 provided on the rear side of the upright portion 28 of the cup shelf or support and in order to prevent the socket from being dislodged from the head, a keeper or latch 42 is provided on the bracket 25 of the support 4, which latch extends into a perforation at 43 in the lower part of the upright portion 28. To dislodge or demount the holder 27, this latch 42 is pressed rearwardly to disengage it from the holder 27 whereupon the holder 27 can be moved upwardly carrying the socket 40 out of engagement with the head 26.

The stirrer 8 is in the form of a disk having a downwardly and outwardly flaring flange which is fluted or formed with corrugations 44, that is, the stirrer is in the form of a miniature inverted hollow pan, the rim of which is fluted. The disk or bottom of the pan is formed with impeller blades or scoops 45 struck therefrom and arranged to create an upward current during the rotation of the stirrer, the blades drawing the contents from the lower portion of the cup. The striking of the blades 45 from the disk provides openings 46 in line with the blades, through which the liquid contents are forced by the blades.

In operation, when the cup is moved upwardly, to engage its upper edge with the trip arm 35 of the latch 30, the latch is tripped so that the lower support 4 can move upwardly and the upper or motor support 3 downwardly. This movement is even or not violent due to the rack and pinion mechanism and the differential effect of the pinions 15, 16. After the contents of the cup have been mixed sufficiently, the operator takes hold of the cup and presses down on the same, moving the cup support downwardly to its lowermost position and through the reversing mechanism moving the motor 5 and the motor support 3 upwardly, until the latch 30 latches into engagement with the shoulder 33. This operation also, because of the pinions 15, 16, requires no appreciable effort. When the filled cup is being moved upwardly, and the stirrer downwardly, a slight unappreciable upward force applied by the hand of the operator to the filled cup is sufficient to overcome the balancing effect. Also, when the operator removes his hand, the movement of the carriage ceases regardless of in what part in their paths of movement the cup and the motor are located.

What I claim is:—

1. In a drink mixer, the combination of a suitable standard, upper and lower supports movable along the standard, a motor carried by the upper support and having a stirrer depending from its rotor, a cup holder mounted on the lower support and motion transmitting and reversing mechanism between the supports including opposing racks carried respectively by the supports and a reversing gear means supported by the standard between the racks and meshing with the racks.

2. In a drink mixer, the combination of a suitable standard, upper and lower supports movable along the standard, a motor carried by the upper support and having a stirrer depending from its rotor shaft, a cup holder mounted on the lower support, and motion transmitting and reversing mechanism between the supports including opposing racks fixed respectively to the supports, and reversing gear means supported by the standard between the racks and including pinions of different diameters meshing respectively with the racks.

3. In a drink mixer, the combination of a suitable standard, upper and lower supports movable along the standard, a motor carried by the upper support and having a stirrer depending from its rotor, a cup holder mounted on the lower support, and motion transmitting and reversing mechanism between the supports including opposing racks connected respectively to the supports, a stationary support mounted on the standard and formed with guides for the racks, and a reversing gear means mounted on the stationary support and meshing respectively with the racks.

4. In a drink mixer, the combination of a suitable standard, upper and lower supports movable along the standard, a motor carried by the upper support and having a stirrer depending from its rotor, a cup holder mounted on the lower support, and motion transmitting and reversing mechanism between the supports including opposing racks connected respectively to the supports, a stationary support mounted on the standard and formed with guides for the racks, and pinions of different diameters mounted on the stationary support between the racks and rotatable as a unit, said pinions meshing respectively with the racks.

5. In a drink mixer, the combination of a standard, channel-shaped in cross section, upper and lower movable supports movable in the channel of the standard, each having a rod extending therefrom lengthwise of the channel, a fixed support in the channel having guide openings in which the rods slide, a motion reversing means carried by the fixed support and coacting with the rods, a motor carried by the upper support and having a stirrer extending from its rotor and a cup holder carried by the lower support.

6. In a drink mixer, the combination of a suitable standard, upper and lower supports movable along the standard, a motor carried by the upper support and having a stirrer depending from its rotor, a cup holder mounted on the lower support, each support having a rod extending therefrom parallel to its path of movement, a fixed support on the standard between the movable supports, the fixed support having guide passages for the rods, and motion reversing means carried by the fixed support and coacting with the rods.

7. In a drink mixer, the combination of a suitable standard, upper and lower supports slidable along the standard, a motor carried by the upper support and having a stirrer depending from its rotor, a cup holder mounted on the lower support, each support having a rod extending therefrom parallel to its path of movement, a fixed support on the standard between the movable supports, the fixed support having guide passages for the rods, one of the movable supports also having a guide passage in which slides the rod of the other movable support, and motion reversing means carried by the fixed support and coacting with the rods.

8. In a drink mixer, the combination of a standard, channel-shaped in cross section, upper and lower supports movable in the channel, a motor carried by the upper support and having a stirrer depending from its rotor, a cup holder carried by the lower support, a support fixed within the channel between the movable supports, each movable support having a guide rod extending parallel to its path of movement and slidably engaging the fixed support, and means carried by the fixed support for transferring and reversing the movement of one rod to the other.

9. In a drink mixer, the combination of a standard, channel-shaped in cross section, upper and lower supports movable in the channel, each having a rod extending therefrom in a direction parallel to its path of movement, a guide block in the channel between the supports and having guide openings through which the rods slide, motion transmitting and reversing means carried by the block and coacting with the rods, a motor carried by the upper carriage and connected thereto through a slot in the bottom of the channel, and a cup holder carried by the lower support, and connected thereto through a slot in the bottom of the channel.

10. In a drink mixer, the combination of a standard, channel-shaped in cross section, upper and lower supports movable in the channel, each having a rod extending therefrom in a direction parallel to its path of movement, a guide block in the channel between the supports and having guide openings through which the rods slide, the rods being formed with rack teeth, pinions concentrically mounted in the block and rotatable as a unit and meshing respectively with the rack teeth of the rods, the channel being formed with slots in its bottom opening through the front side of the standard, a motor carried by the upper support and connected thereto through one of the slots, and a cup holder carried by the lower support, and connected thereto through another of the slots.

HAROLD TOFTE.